United States Patent [19]
Shimamura

[11] Patent Number: 4,759,255
[45] Date of Patent: Jul. 26, 1988

[54] BRAKE BOOSTER WITH SOLENOID VALVES

[75] Inventor: Morihiko Shimamura, Saitama, Japan

[73] Assignee: Jidosha Kiki Co., Ltd., Tokyo, Japan

[21] Appl. No.: 53,994

[22] Filed: May 26, 1987

[30] Foreign Application Priority Data

| May 26, 1986 | [JP] | Japan | 61-120834 |
| May 30, 1986 | [JP] | Japan | 61-81859[U] |
| May 30, 1986 | [JP] | Japan | 61-81861[U] |
| Jun. 12, 1986 | [JP] | Japan | 61-89979[U] |

[51] Int. Cl.⁴ .......................... F01B 25/02; F15B 9/10
[52] U.S. Cl. ........................ 91/6; 91/376 R;
60/545; 60/547.1; 137/630; 251/129.02;
251/129.19
[58] Field of Search .......... 91/360, 6, 376 R;
60/545, 547.1; 137/630, 630.22; 251/129.02,
129.19; 174/77 R

[56] References Cited
U.S. PATENT DOCUMENTS

| 3,362,298 | 1/1968 | Julow | 60/547.1 X |
| 3,371,484 | 3/1968 | Julow | 91/376 R X |
| 3,800,666 | 4/1974 | Kasselmann | 91/376 R |
| 3,871,497 | 3/1975 | Bessiere | 91/6 X |
| 4,667,471 | 5/1987 | Fulmer et al. | 60/547.1 X |

FOREIGN PATENT DOCUMENTS 58-105866 6/1983 Japan .
60-13854 1/1985 Japan .

Primary Examiner—Robert E. Garrett
Assistant Examiner—Mark A. Williamson
Attorney, Agent, or Firm—Flynn, Thiel, Boutell & Tanis

[57] ABSTRACT

A brake booster includes a solenoid valve which enables the opening or closing of a passage which provides a communication between a constant and a variable pressure chamber through a valve mechanism. The invention utilizes an empty space left within the constant pressure chamber for disposing a solenoid valve therein. The solenoid valve is mounted on a valve body in a manner to utilize the entry space efficiently to allow the solenoid valve to be mounted on the valve body without increasing the axial size of the brake booster.

13 Claims, 6 Drawing Sheets

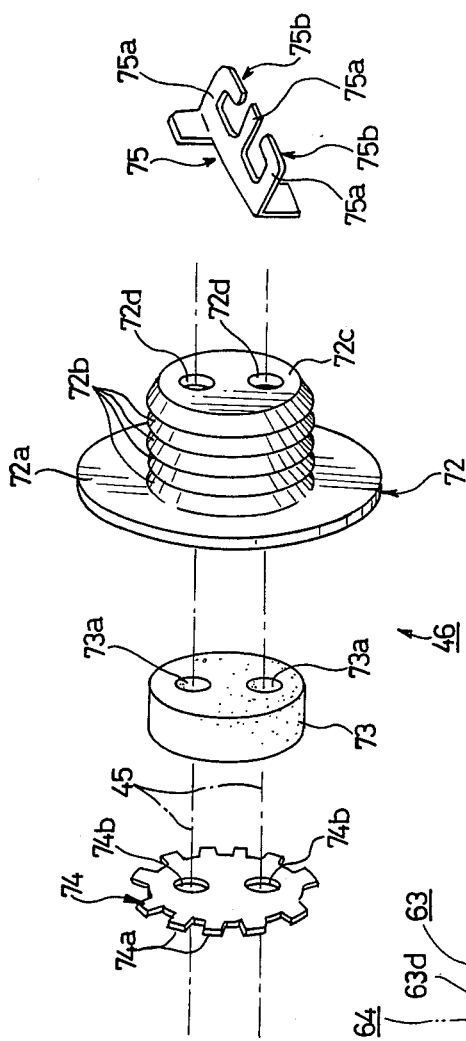
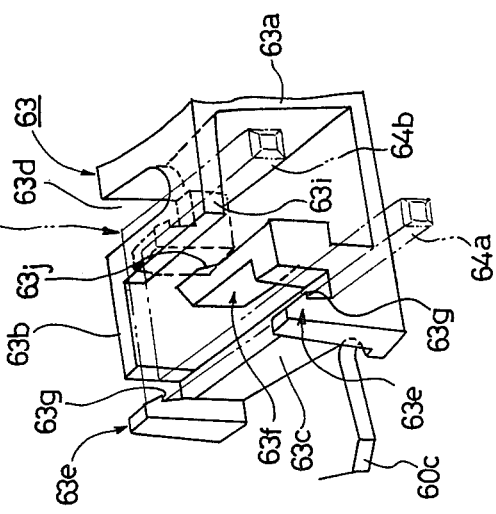
FIG.7
FIG.8
FIG.6

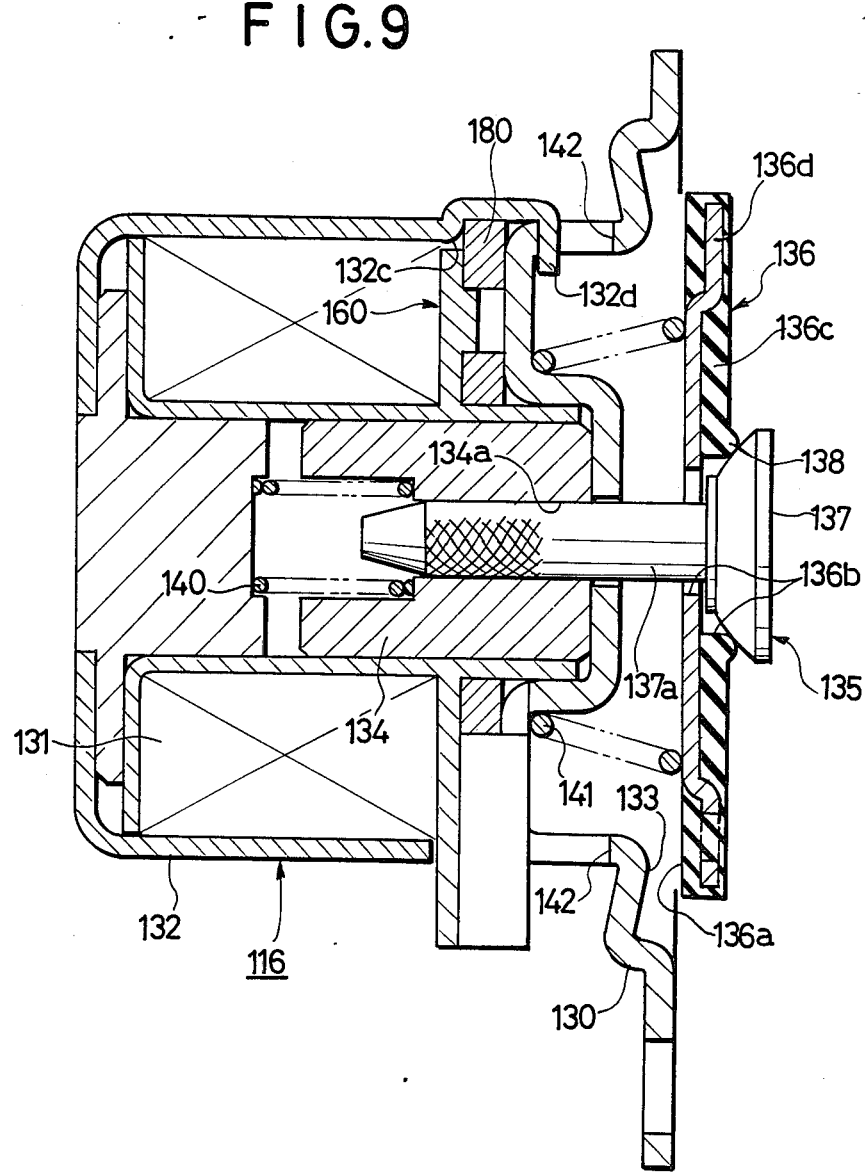

BRAKE BOOSTER WITH SOLENOID VALVES

FIELD OF THE INVENTION

The invention relates to a brake booster, and more particularly, to a brake booster in which a passage which provides a communication between a constant pressure chamber and a variable pressure chamber through a valve mechanism can be opened and closed by means of a solenoid valve.

DESCRIPTION OF THE PRIOR ART

Generally, a brake booster of negative pressure type comprises a power piston slidably disposed in a shell, a valve mechanism received in a valve body located in a shank portion of the power piston, a combination of a constant pressure chamber, located forwardly as viewed in the direction of operation of the power piston and in which a negative pressure is maintained, and a variable pressure chamber, formed rearwardly as viewed in the direction of operation of the power piston and into which the atmospheric pressure is introduced, a first passage formed in the valve body and providing a communication between the constant and the variable pressure chamber through the valve mechanism, a second passage formed in the valve body and providing a communication between the atmosphere and the variable pressure chamber through the valve mechanism, an input shaft operating upon a valve plunger which forms the valve mechanism to change a flow path so as to supply the atmospheric pressure into the variable pressure chamber to cause the power piston to move forward, and an output shaft mechanically coupled to the valve body, whereby a force of depression which is applied to the input shaft in response to the depression of a brake pedal can be boostered to allow a braking action of an increased magnitude to be attained with a reduced depressing force.

Another brake booster of the general type described above is also known (Japanese Laid-Open Utility Model Application No. 13,854/1985) including a solenoid valve disposed in a flexible conduit which is disposed in the constant pressure chamber and having its one end connected to the valve body so as to allow the conduit to communicate with the passage which provides a communication between the constant and the variable pressure chamber through the valve mechanism described and having its other end taken out of the shell where the solenoid valve is disposed, and then connected to the constant pressure chamber, with the variable pressure chamber communicating with the constant pressure chamber through the valve mechanism, the passage and the conduit.

A brake booster of the type described enables a similar operation as achieved in a usual brake booster if the solenoid valve is maintained open. An arrangement may be made to close the solenoid valve when a vehicle speed sensor detects that a vehicle has stopped as a result of a braking action. With such arrangement, if the braking action terminates and the variable and the constant pressure tend to communicate with each other through the valve mechanism and the passage, the closure of the solenoid valve prevents the atmospheric pressure which has been introduced into the variable pressure chamber to find its way into a source of negative pressure through the constant pressure chamber. Accordingly, the braking action can be continued after the brake pedal ceases to be depressed, thus allowing the brake booster to be utilized as a car-stopping braking unit.

A brake booster of the general type described above is also known (Japanese Laid-Open Patent Application No. 105,866/1983) including a solenoid mounted on the power piston and mechanically coupled to a valve plunger, which forms the valve mechanism mentioned above, through a lever, so that when a vehicle is to be stopped, the solenoid is made effective to cause the valve plunger to change a flow path in the valve mechanism so as to achieve a car-stopping braking action even though the brake pedal ceases to be depressed.

In the former arrangement in which the solenoid valve is disposed in the conduit which is taken out of the shell, it is necessary that the variable and the constant pressure chamber be interconnected by a flexible conduit having an increased length, and accordingly, in order to keep a time lag to a comparable level as in the prior art, the conduit must have a certain diameter, but an increased diameter of the conduit presents difficulty in disposing it within the constant pressure chamber. In addition, since the conduit continuously expands and shrinks as the valve body moves back and forth, there is a likelihood that a leakage may occur, in particular, in a joint region thereof.

In the latter arrangement, a difficulty is experienced in containing a solenoid of an increased size within a shell of the brake booster inasmuch as the solenoid must be large enough to operate the valve plunger, its interlocked input shaft, and even the brake pedal which is mechanically coupled to the input shaft depending on the construction.

SUMMARY OF THE INVENTION

Therefore, it is an object of the invention to provide a brake booster which avoids the need for a flexible conduit which interconnects a variable and a constant pressure chamber and which can be operated as a car-stopping brake unit while utilizing a solenoid of a reduced size.

Specifically, in a brake booster of the general arrangement as mentioned above, a solenoid valve which opens or closes the first passage is disposed within the constant pressure chamber and is mounted on the valve body in accordance with the invention. With this arrangement, it is only necessary that the solenoid valve opens or closes a path formed in the valve body and which provides a communication between the constant and the variable pressure chamber through a reduced distance, thus eliminating the need for an increased flow area as would be required when a conventional conduit is used and thus allowing a reduction in the size of the solenoid valve.

Since the solenoid valve of a reduced size is disposed within the constant pressure chamber and is mounted on the valve body, the provision of a mounting space therefor is facilitated. Generally, a brake booster is constructed such that a reentrant cylindrical portion is formed within the shank portion of the shell and the output shaft extends through the cylindrical portion to the exterior with a seal which seals between the constant pressure chamber and the atmosphere disposed thereon. Accordingly, it will be seen that a space is created within the constant pressure chamber by an amount corresponding to the reentrant portion. Hence, when the solenoid valve is disposed within the constant pressure chamber and mounted on the valve body, the solenoid valve which projects from the valve body can be situated within the space when the valve body moves forward, thus allowing an increase in the space of the brake booster which would result from the provision of the solenoid valve to be prevented or suppressed.

Other objects, features and advantages of the invention will become apparent from the following description of several embodiments thereof with reference to the drawings.

BRIEF DESCRIPTION OF THE DRAWINGS

FIG. 6 is a fragmentary perspective view of the assembly shown in FIG. 4;

FIG. 7 is an exploded, perspective view, to an enlarged scale, of a seal unit shown in FIG. 1;

FIG. 8 is a perspective view illustrating the engagement of the harness with the bracket shown in FIG. 7; and FIG. 9 is a cross section of a solenoid valve used in another embodiment of the invention.

DETAILED DESCRIPITON OF EMBODIMENTS

Construction of brake booster

Figure 1:
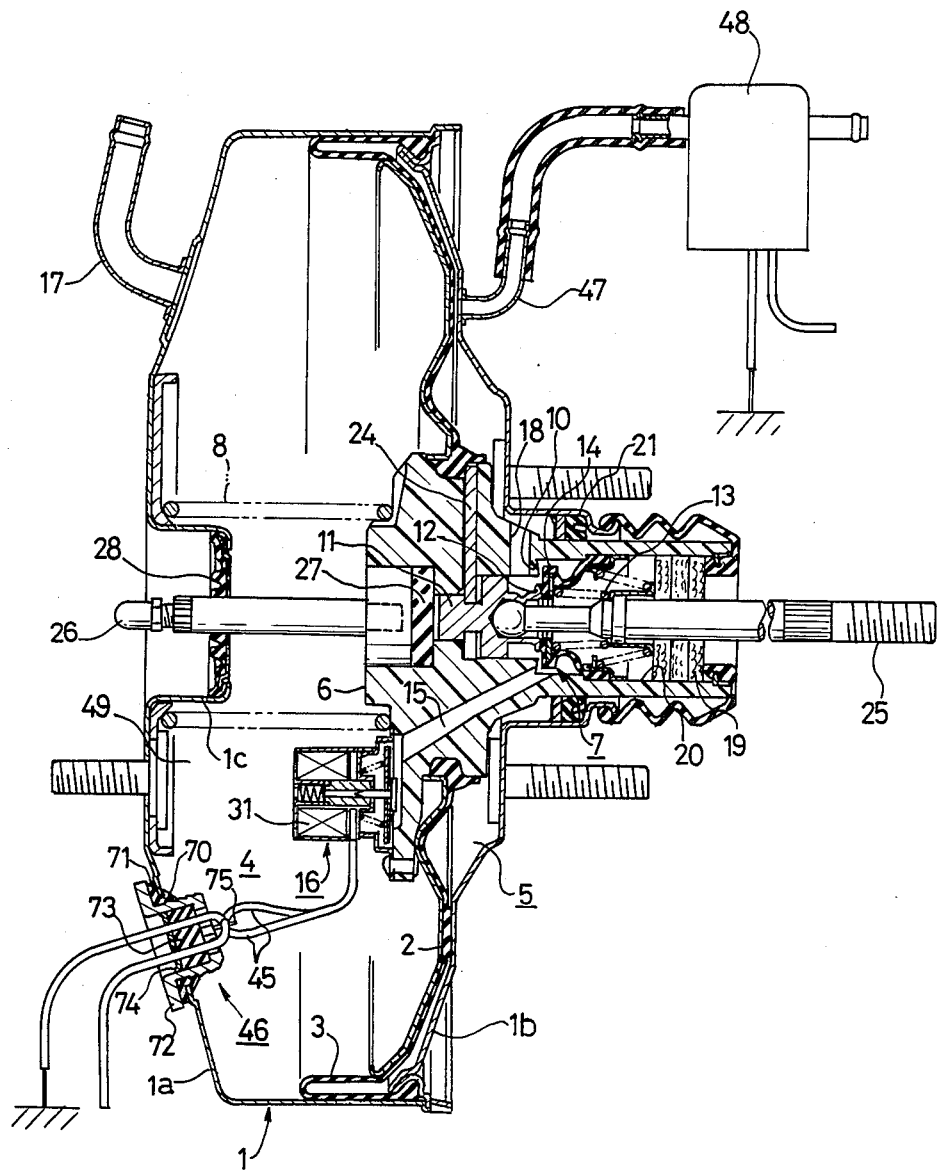
FIG. 1 is a longitudinal section, partly in elevation, of an embodiment of the invention.

Referring to the drawings, several embodiments of the invention will be described. Initially referring to FIG. 1, there is shown a brake booster comprising a shell 1 including a front shell portion 1a and a rear shell portion 1b. A power piston 2 is slidably disposed within the shell 1, and a diaphragm 3 is applied to the back surface of the power piston 2 so that the combination of the power piston 2 and the diaphragm 3 divides the interior of the shell 1 into a forwardly located, constant pressure chamber 4 and a rearwardly located, variable pressure chamber 5. The power piston 2 is formed with a shank on which a valve body 6 is integrally formed, with a valve mechanism 7 which changes a flow path being housed within the valve body 6. The assembly comprising the power piston 2 and the valve body 6 is normally maintained in its inoperative position, shown, by means of a return spring 8.

The valve mechanism 7 comprises a first valve seat 10 which is formed on the valve body 6, a second valve seat formed on a valve plunger 11, and a valve element 14 which is adapted to be seated upon either valve seat 10 or 12 from right-hand side, as viewed in FIG. 1 or rearwardly of the power piston 2, under the resilience of a spring 13. When a seal is defined between the first valve seat 10 and the valve element 14, the outside communicates with the constant pressure chamber 4 through a first passage 15 and a solenoid valve 16, and the constant pressure chamber 4 in turn communicates with a source of negative pressure such as an intake manifold of an engine, not shown, through a tubing 17 which is mounted on the shell 1 for introducing a negative pressure.

On the other hand, a region located intermediate the seal defined by the first valve seat 10 and the valve element 14 and another seal defined by the second valve seat 12 and the valve element 14 communicates with the variable pressure chamber 5 through a common passage 18 which is formed in the valve body 6. The inside of the seal defined by the second valve seat 12 and the valve element 14 communicates with the atmosphere, acting as a source of fluid pressure, through a second passage 20 in which a filter 19 is disposed. It is to be noted that the variable pressure chamber 5 is hermetically sealed against the exterior by a seal member 21 through which the valve body 6 slidably extends.

The valve plunger 11 which forms part of the valve mechanism 7 is prevented from being withdrawn from the valve body 6 by means of a key 24, and its end is coupled to an input shaft 25 which is mechanically coupled to a brake pedal, not shown. The front end face of the valve plunger 11 is disposed in opposing relationship with an end face of an output shaft 26, with a reaction disc 27 interposed between the opposing surfaces. The shank portion of the front shell 1a is formed with a cylindrical, reentrant portion 1c into the shell 1, with a seal member 28 disposed inside the reentrant portion 1c to permit the output shaft 26 to extend slidably therethrough to the outside of the shell 1, with the projecting end of the output shaft 26 being coupled to a piston of a master cylinder, not shown.

The solenoid valve 16 is disposed within the constant pressure chamber 4 and is mounted on the valve body 6 at a location outside and below the coiled, return spring 8 for opening and closing the first passage 15 formed in the valve body 6.

Construction of solenoid valve 16

Figure 2:
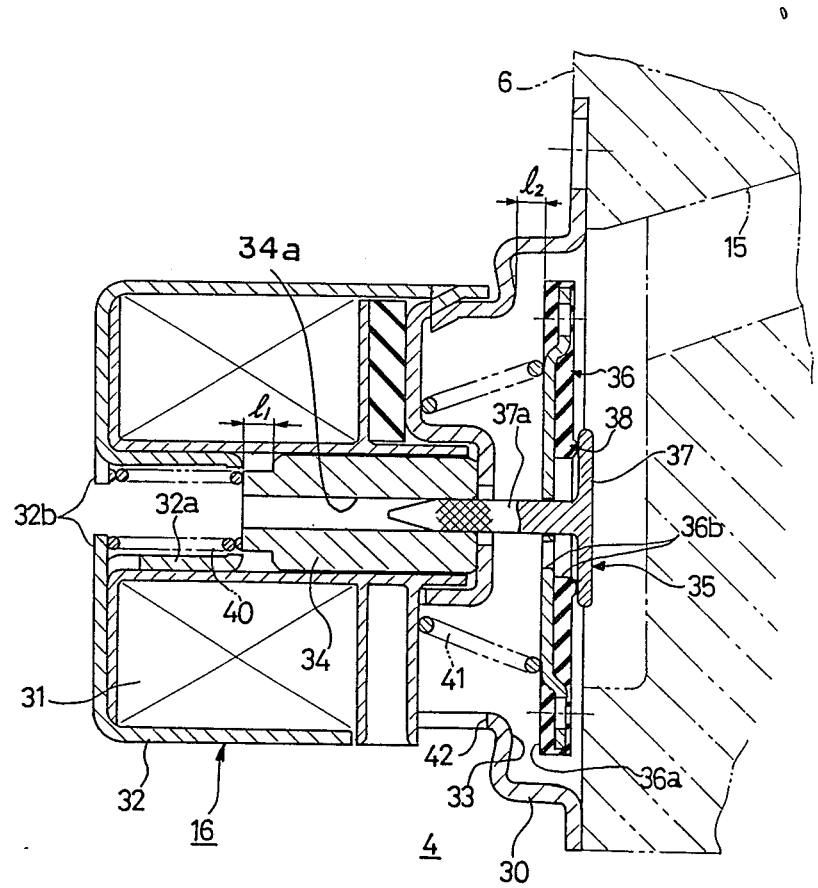
FIG. 2 is an enlarged cross section of a solenoid valve shown in FIG. 1.

As shown to an enlarged scale in FIG. 2, the solenoid valve 16 comprises an essentially dish-shaped casing 30 which is hermetically mounted on the valve body 6 so as to cover the opening of the first passage 15 into the constant pressure chamber 4, and an essentially cup-shaped casing 32 integrally connected to the casing 30 and housing an annular solenoid 31 therein. The dish-shaped casing 30 is stepped in configuration, with the right end face of the step being used as a valve seat 33. Valve means 35 is adapted to be seated upon the valve seat 33, and is formed on a plunger 34 which slidably extends through the solenoid 31.

Valve means 35 comprises an annular first valve element 36 of an increased diameter having its outer periphery formed as a seat area 36a which is adapted to be seated upon the valve seat 33 and having its inner periphery defining a communication path 36b which communicates with the first passage 15, and a second valve element 37 of poppet-type connected to the plunger 34 and slidably extending through the first valve element 36. The second valve element 37 is adapted to be seated upon a valve seat 38, formed around the inner periphery of the first valve element, from the right side to close the communication path 36b. The second valve element 37 has a shank 37a, the surface of which is knurled in directions which are at angles with respect to the axis thereof. The shank 37a is a press fit into an opening 34a formed in the axial portion of the plunger 34, thus integrally connecting the second valve element 37 with the plunger 34.

The cup-shaped casing 32 is formed with a cylindrical reentrant portion 32a integrally, which extends into and is fitted inside the annular solenoid 31. The end of the reentrant portion 32a serves as a stop which limits the movement of the plunger 34 to the left when the solenoid 31 is energized. When the reentrant portion 32a is integrally formed with the casing 32, the efficiency of a magnetic circuit can be improved over that achieved with the use of separate members while reducing the manufacturing cost.

At its bend, the reentrant portion 32a is integrally formed with a plurality of retainers 32b which extend radially inward, and a second spring 40 is disposed inside the reentrant portion 32a to act between the retainers 32b and the plunger 34, thus normally urging the plunger 34 into abutment against the dish-shaped casing 30 so that the plunger 34 and the second valve element 37 are maintained in their inoperative positions shown. Thus, the plunger 34 has a stroke $l_1$ defined between the casing 30 and the end of the reentrant portion 32a.

A first spring 41 is disposed between the annular first valve element 36 and the dish-shaped casing 30 for normally urging the valve seat 38 on the first valve element 36 into abutment against the second valve element 37 which is located in its inoperative position, whereby the first valve element remains in its inoperative position shown. Under this condition, the seat 36a on the first valve element 36 is spaced from the valve seat 33 formed on the dish-shaped casing 30, whereby the first passage 15 communicates with the constant pressure chamber 4 through a clearance between the first valve element 36 and the valve seat 33 and through a path 42 formed in the casing 30. Valve means 35 has a lift $l_2$ which is determined by the spacing between the seat 36a on the first valve element 36 and the valve seat 33 on the casing 30.

Returning to FIG. 1, a two element harness 45 extending from the solenoid 31 of the solenoid valve 16 is taken out of the shell through a seal unit 46 which is disposed in the front shell 1a for connection with a controller, not shown, which includes a microcomputer. It will be noted that the variable pressure chamber 5 communicates with the atmosphere, acting as a source of fluid pressure, through a tubing 47, a solenoid valve 48 and an air cleaner, not shown, without passing through the valve mechanism 7. The solenoid valve 48 is also connected to the controller, not shown. Since the solenoid valve 16 is mounted on the valve body 6 at a location outside and below the coiled return spring 8, an interference of the harness 45 with the return spring 8 can be prevented.

Operation of the brake booster

The operation of the brake booster constructed in the manner mentioned above will now be described. Generally, the controller referred to above closes the solenoid valve 48 which leads to the atmosphere and opens the solenoid valve 16 which leads to the negative pressure. When the brake booster is inoperative under such condition, the negative pressure which is introduced into the constant pressure chamber 4 through the tubing 17 is introduced through the solenoid valve 16, namely, through the path 42 and the clearance between the valve element 36 and the valve seat 33, into the first passage 15, and thence supplied to the variable pressure chamber 5 through the valve mechanism 7 and the passage 18. Accordingly, no pressure differential is developed across the power piston 2 under this condition, and thus the brake booster is maintained in its inoperative condition shown, generally in the similar manner as in a conventional brake booster which is not provided with the solenoid valves 16 and 48.

When the brake pedal is depressed now, it will be evident that a braking effort can be developed in accordance with the degree of depression of the brake pedal, again in the similar manner as in the conventional brake booster. As the valve body moves forward in response to the operation of the brake booster, there is no interference with such movement while maintaining the reduced axial size of the brake booster even though the solenoid valve 16 is disposed therein, inasmuch as the valve 16 is disposed in an empty space 49 which is left within the constant pressure chamber 4 by forming the reentrant portion 1c in the front shell 1a.

When the brake booster is to operate as a carstopping braking unit, the controller referred to above responds to operating parameters derived by various sensors, not shown, and energizes the solenoid 31 of the solenoid valve 16 to cause the both valve elements 36, 37 to move to the left as one unit against the resilience of the springs 40, 41 to cause the valve element 36 to be seated upon the valve seat 33 to thereby close the valve 16 when these parameters satisfy a given requirement.

At the same time, the controller opens the solenoid valve 48 leading to the atmosphere for a given time interval T, whereby the atmospheric pressure which depends on the time interval T is admitted into the variable pressure chamber 5 through the tubing 47, thus allowing the braking action to be effective even though no depressing force is applied to the input shaft 25.

Upon termination of the car-stopping braking operation when the controller deenergizes the solenoid 31, it will be noted that the atmospheric pressure is acting upon the both valve elements 36, 37 to urge them against the valve seats 33, 38, respectively, and the valve element 37 of poppet-type which has a smaller diameter and hence a smaller pressure responsive area is initially urged by the spring 40 to move to the right away from the valve seat 38 on the annular valve element 36. Thereupon, the first passage 15 communicates with the constant pressure chamber 4 through the axial path 36b in the annular valve element 36 to reduce the pressure which prevails in the first passage 15. When such pressure reduces below a given value, a movement of the annular valve element 36 from the valve seat 33 under the influence of the spring 41 is facilitated, whereby the first passage 15 communicates with the constant pressure chamber 4 with a greater flow area, allowing the pressure within the first passage 15 and hence within the variable pressure chamber 5 to be reduced rapidly.

From the foregoing, it will be appreciated that upon energization of the solenoid 31, the first passage 15 can be positively closed since the atmospheric pressure acts upon the both valve elements 36, 37 to urge them against the valve seats 33, 38 in addition to the electromagnetic force from the solenoid 31 while upon deenergization of the solenoid 31, the pressure within the variable pressure chamber 5 can be reduced rapidly. As compared with the use of a single valve element for the valve means 35, the resilience of the both springs 40, 41 can be reduced, and hence the solenoid 31 is required to cause the valve element 36, 37 to be seated upon the valve seats against the resilience of such reduced magnitude, allowing the solenoid 31 and hence the solenoid valve 16 to be reduced in size.

In a brake booster of negative pressure type, a solenoid valve corresponding to the solenoid valve 16 disposed within the constant pressure chamber 4 will be disposed in vacuum, and hence rust-proof or insulating treatment can be simplified or eliminated.

It should be understood that if required, the tubing 47 and the solenoid valve 48 may be eliminated while driving the input shaft 25 forward to change the flow path of the valve mechanism 7, thereby introducing the atmospheric pressure into the variable pressure chamber 5 to achieve a car-stopping braking operation.

Assembly of solenoid valve 16

The solenoid valve 16 must be assembled so that a given length of the shank 37a of the second valve element 37 is fitted into the opening 34a in the plunger 34 in order to make the lift $l_2$ of the valve means 35 to be substantially equal to or slightly less than the stroke $l_1$ of the plunger 34. During the assembling process, components of the solenoid valve 16 are initially assembled together in a manner illustrated, with the shank 37a of the second valve element 37 fitted into the opening 34a of the plunger 34 to a degree which prevents the shank from being withdrawn therefrom under the resilience of the first spring 41. Subsequently, the casing 32 of the solenoid valve 16 is placed in a vertical position on a support table 50 and the casing 30 is mounted on a sealing member 51, which corresponds to the valve body 6, in a manner illustrated in FIG. 3.

The sealing member 51 is formed with a passage 55 which communicates with a source of compressed air 54 through a conduit 52 and a valve 53. When the first valve element 36 is spaced from the valve seat 33, the air which is fed from the source 54 into the sealing member 51 through the valve 53, the conduit 52 and the passage 55 passes through the clearance between the first valve element 36 and the valve seat 33 and the path 42 formed in the casing 30 to be exhausted into the atmosphere. A pressure detector 56 is disposed in the conduit 52.

A pressing head 57 is mounted in the sealing member 51 so as to be opposite to the valve means 35 and is vertically movable while maintaining a hermetic seal. The pressing head 57 can be lowered toward the valve means 35 as by a cylinder unit, not shown.

When the solenoid valve 16 is mounted between the sealing member 51 and the support table 50, the valve 53 is opened to supply air from the source 54, and then the pressing head 57 is lowered. The pressing head 57 then moves into abutment against the second valve element 37 to force the second valve element 37 and the first valve element 36 down together against the springs 40, 41, whereby the plunger 34 is also forced down in integral manner with the second valve element 37. When the plunger 34 strokes through the given stroke $l_1$, its further downward movement ceases as a result of abutment against the end of the reentrant portion 32a.

The pressing head 57 continues to be lowered after the plunger 34 ceases to move down, so that the entire valve means 35 will be forced down while causing the shank 37a of the second valve element 37 to be pressingly fitted into the opening 34a of the plunger 34 which remains at rest until the seat 36a on the first valve element 36 becomes seated upon the valve seat 33, whereupon the pressure which prevails upstream of the seat increases and is detected by the detector 56 to cease the downward movement of the pressing head 57.

Under this condition, the lift $l_2$ of the valve means 35 substantially coincides with the stroke $l_1$ of the plunger 34. If required, the pressing head 57 may be further lowered through a small incremental stroke while causing an elastic deformation of the first valve element 36, whereby the stroke $l_1$ of the plunger 34 may be made slightly greater than the lift $l_2$ of the valve means 35.

Figure 3:
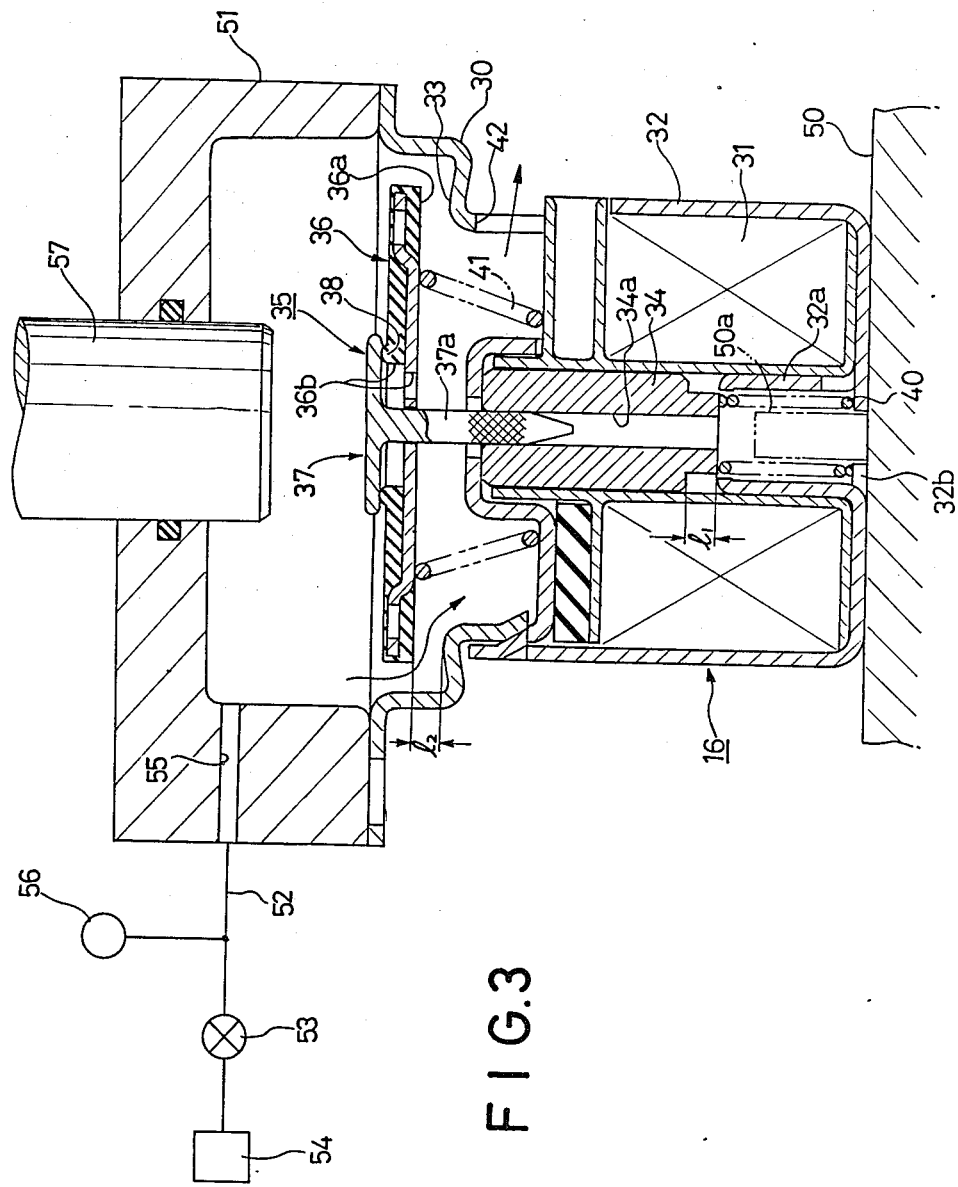
FIG. 3 is a cross section illustrating the process of manufacturing the solenoid valve.

As indicated in phantom lines in FIG. 3, a support member 50a may be mounted on the support table 50 for abutment against the lower end face of the plunger 34 in order to prevent the reentrant portion 32a from being loaded excessively. As a further modification, the height of the support member 50a may be chosen such that the plunger 34 abuts against the support member 50a immediately before it abuts against the end of the reentrant portion 32a, thereby automatically establishing a stroke $l_1$ of the plunger 34 which is slightly greater than the lift $l_2$ of the valve means 35 when the seat 36a on the first valve element 36 is seated upon the valve seat 33.

After the downward movement of the pressing head 57 is stopped, the solenoid 31 may be energized to maintain the valve means 35 in position while simultaneously causing the pressing head 57 to be raised and the valve 53 to be closed to interrupt the air supply, thus enabling the detector 56 to examine the presence or absence of any leakage.

If it is found that there is no leakage, the solenoid 31 is deenergized to examine the returning operation of the valve. At this time, the second valve element 37 having a smaller pressure responsive area initially moves away from the valve seat 38 on the first valve element 36 under the resilience of the second spring 40, causing the air pressure within the sealing member 51 to fall, whereupon the first spring 41 causes the first valve element 36 to move away from the valve seat 33. When the both valve elements 36, 37 have returned to their original, inoperative positions, the valve 53 is opened again to resume the air supply, and the solenoid 31 is energized again to repeat the leakage test again under this condition. Upon completion of the described examination or test, the solenoid valve is dismounted from between the sealing member 51 and the support table 50.

Connection between the solenoid 31 and the harness 45

Figure 4:
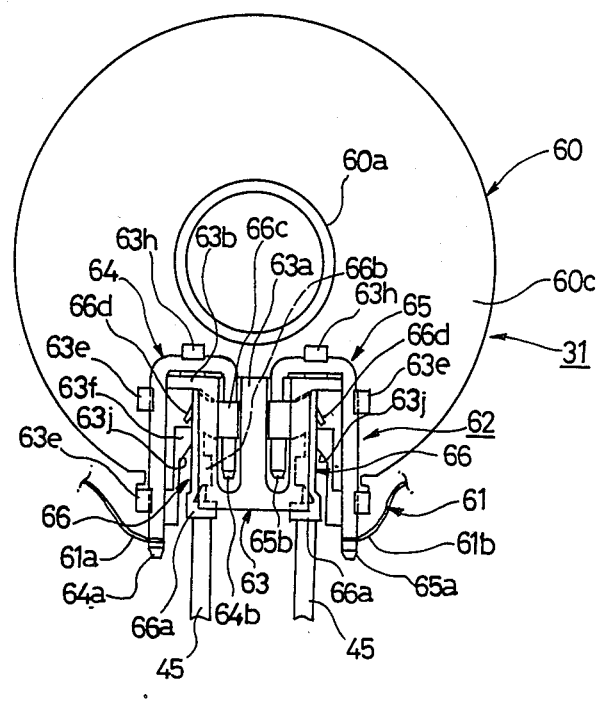
FIG. 4 is a right-hand side elevation illustrating the connection between a solenoid and a harness of the solenoid valve.
Figure 5:
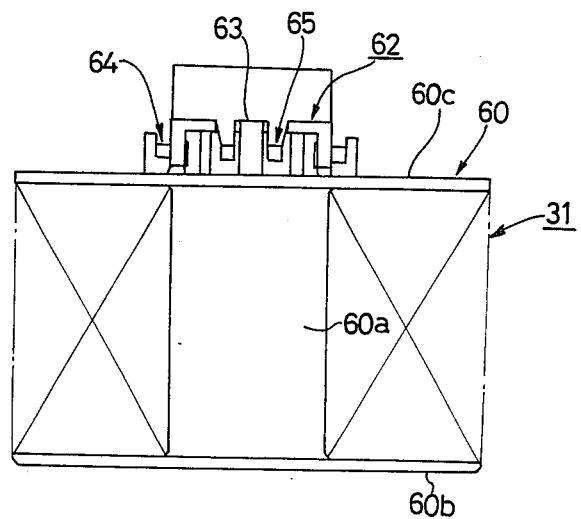
FIG. 5 is a front view of the assembly shown in FIG. 4.

Referring to FIGS. 4 and 5, it will be noted that the solenoid 31 comprises a spool 60 formed of synthetic resin and a coil wire 61 disposed thereon. The spool 60 comprises a cylindrical shank 60a, a flange 60b on one end of the shank, and another flange 60c disposed slightly inside the other end of the shank 60a. The coil wire 61 forms a winding between the pair of flanges 60b, 60c. On its open side or opposite side from the coil, the flange 60c is provided with a connector 62 where the harness 45 is electrically connected to opposite ends 61a, 61b of the coil wire 61. The connector 62 comprises a support block 63 integrally molded from synthetic resin with the flange 60c, and a pair of substantially U-shaped pins 64, 65 mounted on the support block 63 so that their extremities are directed radially outward of the flange 60c. Each of the pins 64, 65 comprises a filamentary conductive material having a rectangular cross section which is folded into a U-configuration.

One end 61a of the coil wire 61 is connected to the extremity 64a of the pin 64 while the other end 61b of the coil wire 61 is connected to the extremity 65a of the other pin 65. Each element of the harness 45 carries a connection terminal 66 on its free end, which is connected to the other extremity 64b or 65b of the pin 64 or 65, respectively, whereby the respective harness 45 is electrically connected to the coil wire 61 through the connection terminal 66 and the pin 64.

It is to be noted that the support block 63 is constructed to be symmetrical with respect to the center line as viewed in the lateral direction, with the pin 64 being supported on one side and the pin 65 supported on the other side. Accordingly, only the portion of the support block 63 associated with the pin 64 will be described. Referring to FIG. 6 in combination with FIG. 4, the support block 63 comprises a central wall 63a which extends radially of the flange 60c, a stop wall 63b which is disposed to extend at right angles to the central wall 63a from its radially inner end, and a support wall 63c which extends radially outward in parallel relationship with the central wall 63a from the free end of the stop wall 63b. The combination of the central wall 63a, the stop wall 63b and the support wall 63c defines a wall surface which is channel-shaped in horizontal section and is open toward radially outer end of the flange 60c.

The support wall 63c has a height which is lower than that of the central wall 63a and the support wall 63b so that the limb of the pin 64 which is located adjacent to the extremity 64a may be placed thereon. The stop wall 63b is formed with a slit 63d which is cut from the top end thereof to a point level with the elevation of the support wall 63c, thus allowing the bend of the U-shaped pin 64 which has its limb placed on the support wall 63c to extend radially inward of the stop wall 63b while allowing the other limb located toward the other extremity 64b to extend through the slit 63d. In this manner, the U-shaped pin 64 is disposed horizontally, and the other extremity 64b is located within the channel-shaped wall surface.

On its outside, the support wall 63c is integrally formed with a pair of stops 63e adjacent to its opposite ends, while on its inside, the support wall is integrally formed with an engaging portion 63f toward its open end which is located opposite to the stop 63e. Each of the stop 63e and the engaging portion 63f extend to a higher elevation than the support wall 63c, and the top end of each stop 63e is formed with a triangular pawl 63g which projects above the top surface of the support wall 63c for engagement therewith.

Accordingly, as the limb of the pin 64 located nearer the extremity 64a is lowered and is caused to move past the pawl 63g while causing an elastic deformation thereof until it is placed upon the support wall 63c, the limb will be held between the stop 63e and the stop wall 63b toward the bend and will be held between the stop 63e and the engaging portion 63f toward the extremity 64a while its top surface will be supported by the pawl 63g on the stop 63e. Accordingly, a movement of the limb in both the horizontal and the vertical direction will be constrained except for a lengthwise movement thereof.

A similar stop 63h is formed at a radially inner end of the stop wall 63b (see FIG. 4), thereby constraining the lengthwise movement and an angular movement therearound of the limb located toward the extremity 64a. In this manner, the pin 64 is secured in position to the block 63 by three stops 63e and 63h.

The metallic connection terminal 66 attached to the free end of the harness 45 comprises a holder 66a which holds the enclosure of the harness 45, a holder 66b which holds conductive wires of the harness 45, a connector 66c adapted to engage the periphery of either extremity 64b or 65b of the pin 64 or 65, and an engaging portion 66d adapted to engage the engaging portion 63f formed on the support block 63.

The engaging portion 63f on the support block 63 is capable of guiding the connection terminal 66 together with a top wall 63i, which projects from the top end of the central wall 63a toward the engaging portion 63f, as the terminal is inserted from the exterior, and is formed with a bevelled surface 63j at its inner end which is relieved toward the exterior. On the other hand, the engaging portion 66d formed on the connection terminal 66 is adapted to engage the bevelled surface 63j and moves past it while causing an elastic deformation of the engaging portion 63f while it is elastically deformed itself, thus engaging the inner end of the engaging portion 63f to prevent the withdrawal of the connection terminal 66.

Accordingly, when the solenoid valve 16 is assembled, the pins 64, 65 are initially secured on the support block 63. At this time, the pins 64, 65 can be easily mounted on the support block 63 by forcing them down while elastically deforming the stops 63e, 63h. Once the pins 64, 65 are mounted on the support block 63, one end 61a of the coil wire 61 disposed around the spool 60 is connected to the extremity 64a of one pin 64 while the other end 61b is connected to the extremity 65a of the other pin 65, as by soldering or connector tips.

When the pins 64, 65 are assembled with the spool 60 in a manner mentioned above, the resulting spool 60 is inserted into the casing 32 of the solenoid valve 16. Subsequently, the plunger 34, the other casing 30 and the valve means 35 are assembled together to complete the solenoid valve 16, which is then mounted on the valve body 6.

On the other hand, the two element harness 45 is led into the shell through the seal unit 46 disposed in the front shell 1a, the enclosure of the harness 45 is inserted into the holder 66a of the respective connection terminal 66 while inserting the conductive wires of the harness 45 into the other holder 66b. By crimping the respective holders 66a, 66b, the connection terminals 66 are electrically connected to the free ends of the respective harness 45.

Subsequently, the connector 66c of each connection terminal 66 of the harness 45 is fitted around the respective extremity 64b or 65b of the pin 64 or 65, and the connection terminal 66 may be forced into the support block 63 until the engaging portion 66d of the connection terminal 66 moves past the engaging portion 63f on the support block 63 to abut against the stop wall 63b, whereupon the engagement between the member 63f, 66d is effective to prevent the withdrawal of the connection terminal 66, thus completing the connection of the harness 45 to the solenoid valve 16.

The harness 45 can be easily connected to the coil wire 61 in the manner mentioned above, and if the harness 45 is pulled for some reason, the resulting tension is resisted by the spool or specifically between the engaging portions 63f and 66d on the support block 63 and the connection terminal 66, respectively, and cannot be transmitted to the coil wire 61, thus preventing the breakage of the thin coil wire 61.

When dismounting the connection terminal 66, a screwdriver may be inserted between the connection terminal 66 and the engaging portion 63f on the support block 63 to cause an elastic deformation of the engaging portion 63f, whereby it may be disengaged from the engaging portion 66d on the connection terminal 66. The support block 63 is integrally formed on the spool 60 in the described embodiment, but it should be understood that it may be formed separately, or alternatively, the pins 64, 65 may be integrally embedded into the spool 60.

Construction of seal unit 46

As shown in FIG. 1, the seal unit 46 comprises a cylindrical holder 72 having a closed end which is mounted in an opening 70 formed in the front shell 1a in a hermetically sealed manner, a seal member 73 disposed within the holder 72, and a locking stop 74 which prevents the seal member 73 from being removed from the holder 72.

Referring to FIG. 7, the holder 72 includes a flange 72a toward its open end which projects radially outward. It also carries a plurality of corrugations 72b each having an increased diameter toward the flange 72a. The holder 72 has a bottom wall 72c which is formed with a pair of holes 72d for allowing the two element harness 45 to pass therethrough.

The seal member 73 is in the form of a disc of an elastic material having an external diameter which enables it to be a press fit into the holder 72. It also has holes 73a which are aligned with the holes 72d in the bottom wall 72c of the holder 72.

The stop 74 is in the form of a castellated washer of a resilient material, and includes a plurality of projections 74a around its periphery, which may be elastically deformed when it is to be fitted into the holder 72, whereby it is capable of preventing the seal member 73 from being withdrawn from the holder 72. The stop 74 is also formed with holes 74b which are aligned with the holes 73a and 72d.

Referring to FIGS. 1 and 7, it will be seen that the holes 72d, 73a and 74b formed in the bottom wall 72c of the holder 72, in the seal member 73 and in the stop 74, respectively, are aligned with each other, and the hermetic seal between the holder 72 and the harness 45 is maintained by an elastic deformation of the seal 73 as the seal member 73 is pressingly fitted into the holder 72 and an elastic deformation of the seal member as the stop 74 is pressed against the seal member 73 to hold the latter between the stop 74 and the bottom wall 72c of the holder 72.

A bracket 75 is mounted on the external surface of the bottom wall of the holder 72 at a location intermediate the holes 72d. The bracket 75 includes stanchions 75a which extend from its opposite ends and from the center in a direction perpendicular to the external end face of the bottom wall. The stanchions 75a extending from the opposite ends are bent toward the central stanchion, thus defining L-shaped sections 75b. As shown in FIG. 8, the two element harness 45 which is passed through the holes 72d in the holder 72 is wrapped around the L-shaped sections 75b.

During the assembly of the brake booster, before the front and the rear shell 1a, 1b are brought into abutting relationship with each other and connected together, various components are assembled therein, and the two element harness 45 extending from the solenoid valve 16 is taken out through the opening 70 formed in the front shell 1a. It is to be noted that the opening 70 may have an increased size as compared with a prior art arrangement in which a seal member fitted into the opening is used to seal the harness directly, thus facilitating the passage of the harness 45 through the opening 70.

Subsequently, the harness 45 which is taken out of the shell 1 through the opening 70 is initially passed through the holes 72d in the bottom wall 72c of the holder 72, and then sequentially through the holes 73a in the seal member 73 and the holes 74b in the stop 74 while the holder 72, the seal member 73 and the stop 74 are disassembled and at a location outside the shell 1. At this time, the seal member 71 is previously fitted around the holder 72 in contact with the flange 72a.

Then, while pulling the harness 45 from the bottom wall 72c side of the holder 72, the seal member 73 is pressed into the holder 72 and the stop 74 is pressed into the holder 72 to thereby urge against the seal 73, thus allowing the seal member 73 to be held between the stop 74 and the bottom wall 72c of the holder 72 to undergo an elastic deformation, thus maintaining a hermetic seal between the holder 72 and the harness 45.

When such condition is achieved, each element of the harness 45 is wrapped around the respective L-shaped section 75b of the bracket 75, and the holder 72 is fitted into the opening 70 in the shell 1. By fitting the seal member 71 placed thereon into the opening 70, a mounting operation of the sealing unit 46 onto the shell 1 is completed.

When the assembly is completed in this manner, if the harness 45 is pulled laterally or in a direction transverse to the length of the holes, the seal member 73 cannot be elastically deformed to cause a leakage as a result of a lateral tension, because the harness 45 is supported by the stop 74 and the bottom wall 72c of the holder 72. Accordingly, a satisfactory seal can be maintained.

Because the harness 45 is wrapped around the bracket 75 which is attached to the holder 72, the bracket 75 is effective to prevent the withdrawal of the harness 45 under the influence of an axial tension, thus effectively preventing an electrical disconnection between the harness 45 and the solenoid valve 16 located within the shell 1.

Another embodiment of solenoid valve

FIG. 9 shows another embodiment of solenoid valve, which is essentially the same as the solenoid valve 16 mentioned previously, and corresponding or like parts are designated by like reference numerals to which 100 is added.

Specifically, a solenoid valve 116 of this embodiment includes a second valve element 137 having a spherical surface for seating upon a valve seat 138. This assures a reliable seating of the second valve element 137 upon the valve seat 138 to thereby prevent the occurrence of an imperfect hermetic seal if a shank 137a of the second valve element 137 becomes curved or skewed when the valve element is pressingly fitted into a plunger 134.

A first valve element 136 comprises a resilient member 136c which functions as a sealing member and which is carried by a carrier plate 136d. In this manner, the second valve element 137 is enabled to abut against the carrier plate 136d in the event that the elastic member 136c undergoes a greater degree of elastic deformation than required, even though the second valve element 137 is usually seated upon the valve seat 138 on the first valve element 136 which is formed by the elastic member 136c, without causing its abutment against the carrier plate 136d. As a result of such construction, when the resilient member 136c has aged enough to lose its resilience as a result of its use over a prolonged period of use, the second valve element 137 is caused to abut against the carrier plate 136d to prevent an excessive deformation of the resilient member 136c. A rapid aging effect of the resilient member 136c or the occurrence of an imperfect hermetic seal as a result of a permanent deformation is thus effectively prevented.

Adjacent to its opening, a cup-shaped casing 132 is formed with a step 132c which has an increased diameter toward the opening, thus allowing a spacer 180 comprising a magnetizable material which is mounted on a spool 160 of a solenoid 131 to abut against the step 132c. The cup-shaped casing 132 is provided with a crimped portion 132d, which cooperates with the spacer 180 to hold a dish-shaped casing 130 therebetween, thus integrally connecting the both casings 130, 132 together.

With this construction, when the dish-shaped casing 130 is crimped to the cup-shaped casing 132, the force applied can be received by the spacer 180 and the casing 132, thus effectively preventing any damage which may be caused to the spool 160 by such forces. In addition, the spacer 180 and the casing 132 are tightly contacted at the step 132c, thus contributing to an improvement in the performance of a magnetic circuit.

Although the invention has been illustrated and described above in connection with the several embodiments thereof, it should be understood that a number of changes, modifications and substitutions therein will readily occur to one skilled in the art from the above disclosure without departing from the spirit and scope of the invention defined by the appended claims.

What is claimed is:

1. A brake booster including a power piston slidably disposed within a shell, a valve mechanism received in a valve body which is disposed in an axial portion of the power piston, a constant pressure chamber and a variable pressure chamber defined forwardly and rearwardly, respectively, of the power piston, as viewed in the direction of operation thereof, a first passage formed in the valve body for providing a communication between the constant and the variable pressure chamber through the valve mechanism, a second passage formed in the valve body for providing a communication between a source of fluid pressure and the variable pressure chamber through the valve mechanism, an input shaft operating upon a valve plunger, which forms part of the valve mechanism, to change a flow path in order to supply fluid pressure to the variable pressure chamber to cause the power piston to move forwardly, a cylindrical, reentrant portion formed in an axial portion of the shell, and an output shaft having its one end mechanically coupled to the valve body and having its free end projecting externally through the reentrant portion;

characterized by a solenoid valve disposed within the constant pressure chamber and mounted on the valve body for opening and closing the first passage.

2. A brake booster according to claim 1, further including a fluid path which provides a communication between the variable pressure chamber and a source of fluid pressure without passing through the valve mechanism, and a second solenoid valve for opening and closing the fluid path.

3. A brake booster according to claim 1 in which the solenoid valve is mounted on the valve body at a location outside and below a coiled return spring which urges the power piston and the valve body to their inoperative positions.

4. A brake booster according to claim 1 in which the solenoid valve allows valve means to move away from its associated valve seat under the resilience of a spring to open the first passage whenever a solenoid of the solenoid valve is deenergized and causes the valve means to be seated upon its associated valve seat to close the first passage while simultaneously allowing fluid pressure to act upon the valve means to urge it against the valve seat when the solenoid is energized, and wherein the combination of the spring and the valve means comprises an annular, first valve element having its outer periphery formed as a seat which is adapted to seat upon the valve seat and having its inner periphery formed with a communication path which communicates with the first passage and urged by a first spring in a direction to move away from the valve seat when the solenoid is deenergized, and a second valve element for seating upon the first valve element to close the communication path while simultaneously causing the first valve element to be seated upon the valve seat to close the first passage against the resilience of the first spring when the solenoid is energized, the second valve element being urged by a second spring to move away from the first valve element which has seated upon the valve seat when the solenoid is deenergized.

5. A brake booster according to claim 4 in which a portion of the second valve element which is adapted to be seated upon the first valve element is formed as a spherical surface.

6. A brake booster according to claim 4 in which the first valve element comprises a resilient member which functions as a sealing member and which is carried by a carrier plate, the second valve element being capable of seating upon the valve seat on the first valve element which is formed of a resilient member and also abutting against the carrier plate, thereby preventing an excessive deformation of the resilient member as a result of an abutment of the second valve element against the carrier plate.

7. A brake booster according to claim 1 in which the solenoid valve comprises a casing in which a solenoid is received, a plunger slidably fitted into the solenoid, valve means connected to the plunger, and a valve seat formed on the casing, the plunger being operated when the solenoid is energized to cause its connected valve means to be seated upon the valve seat to thereby close the first passage, one of the plunger and the valve means being formed with an opening while the other is formed with a shank which can be controllably fitted into the opening, the plunger and the valve means being coupled together by fitting the shank to a given degree into the opening.

8. A brake booster according to claim 1 in which the solenoid valve comprises a cup-shaped casing in which an annular solenoid is received, a plunger slidably fitted into the solenoid, valve means mechanically coupled to the plunger, and a spring for urging the plunger to its inoperative position, the cup-shaped casing being integrally formed with a cylindrical, reentrant portion which is fitted inside the solenoid, the reentrant portion being integrally formed with a retainer at its bend which extends radially inward, said spring being disposed inside the reentrant portion to act between the retainer and the plunger.

9. A brake booster according to claim 1 in which the solenoid valve comprises a cup-shaped casing in which an annular solenod is received, and an essentially dish-shaped casing which is mounted on the valve body for surrounding the first passage, the first passage communicating with the constant pressure chamber through a valve seat formed on the dish-shaped casing, valve means which is operated by the solenoid being adapted to be seated upon the valve seat to interrupt a communication between the first passage and the constant pressure chamber.

10. A brake booster according to claim 9 in which the cup-shaped casing is formed with a step having an increased diameter toward its opening, a spacer being disposed in abutment against the step, the solenoid being disposed inside the spacer, the dish-shaped casing being integrally connected to the cup-shaped casing by being held between a crimped portion of the cup-shaped casing and the spacer.

11. A brake booster according to claim 1 in which the solenoid valve comprises a solenoid formed by a winding of a coil wire upon a spool which carries a pair of conductive pins, there being provided a two element harness, each element of which carries a connection terminal on its free end which can be connected to the tip of the pin, one end of the coil wire being connected to one tip of one of the pins, the other end of the coil wire being connected to one tip of the other pin, the connection terminals on the harness being connected to the other tips of the pins.

12. A brake booster according to claim 1, further comprising a cylindrical holder having a closed bottom which is mounted in an opening formed in the shell in a hermetically sealed manner, the holder sequentially receiving therein a seal member and a locking stop which prevents the withdrawal of the sealing member from the holder, the bottom wall of the holder, the sealing member and the stop being each formed with a hole extending therethrough through which the harness connected to the solenoid of the solenoid valve extends while maintaining a hermetic seal between the holder and the harness by means of the sealing member.

13. A brake booster according to claim 12, further including a bracket including at least essentially L-shaped section and mounted on the external end face of the bottom wall of the holder, the harness being wrapped around the bracket after its passage through the bottom wall of the holder.

* * * * *